No. 11,758.

Reissued July 11, 1899.

G. H. CHANDLEE.

WIRE FENCE.

(Application filed Apr. 20, 1899.)

Witnesses

Geo. M. Cofenhaver.

H. Chandlee.

George H. Chandlee

Inventor by

Chandlee & Chandlee

Attorneys

UNITED STATES PATENT OFFICE.

GEORGE H. CHANDLEE, OF WASHINGTON, DISTRICT OF COLUMBIA, ASSIGNOR TO THE CHANDLEE FENCE COMPANY, OF BALTIMORE, MARYLAND.

WIRE FENCE.

SPECIFICATION forming part of Reissued Letters Patent No. 11,758, dated July 11, 1899.

Original No. 581,195, dated April 20, 1897. Application for reissue filed April 20, 1899. Serial No. 713,822.

*To all whom it may concern:*

Be it known that I, GEORGE H. CHANDLEE, a citizen of the United States, residing at Washington, in the District of Columbia, have invented certain new and useful Improvements in Wire Fences; and I do hereby declare the following to be a clear, full, and exact description of the invention, such as will enable others skilled in the art to which it appertains to make and use the same.

My invention relates to fences in general, and more particularly to that class formed of what are technically called "strand" and "stay" wires, having suitably-distributed supports; and the invention relates particularly to the means for fastening the stay-wires to the strand-wires. As fences of this general nature have been heretofore constructed they have been more or less defective not only on account of their expense, but also because of the ordinary requirement of costly tools, as well as the labor incident to their application.

In accordance with my invention I provide a lock which may be readily applied to the strand-wires, after which the stay-wires are put in place and the lock manipulated to retain the latter in position. The locks may be cast, in which event a wedge is used to secure the necessary gripping action on the strand and stay wires; or, if preferred, the lock may be made of sheet metal, when a wedge may be employed; or, if preferred, the material of the lock may be bent by a suitable tool to cause the same action.

Figure 1:
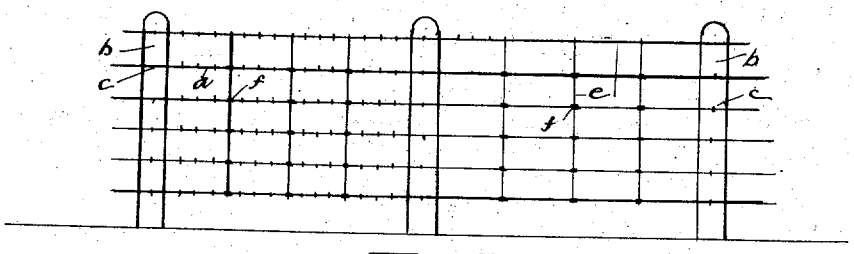
Figure 2:
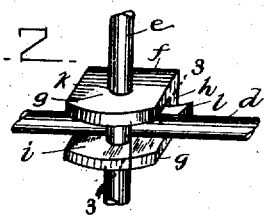
Figure 3:
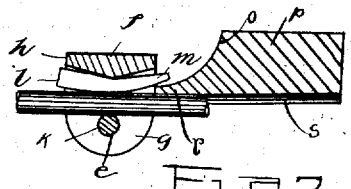
Figure 4:
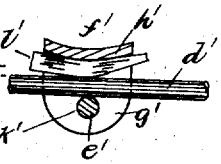
Figure 5:
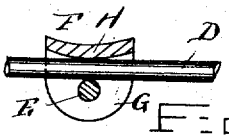
Figure 6:
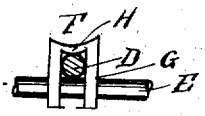
Figure 7:
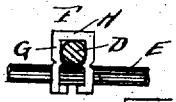
Figure 8:
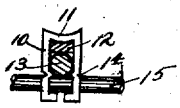
Figure 9:
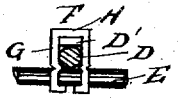

In the drawings forming a portion of this specification and in which like letters and numerals of reference indicate similar parts in the several views, Figure 1 is a view showing the general manner of employment of my invention, one panel including a barbed wire in its construction, while the other panel shows plain wire. Fig. 2 is a detailed perspective view of one form of my lock, showing the arrangement of the strand and stay wire and wedge. Fig. 3 is a section on line 3 3 of Fig. 2, showing the method of bending the wedge when desired. Fig. 4 is a view similar to Fig. 3, showing the form of the lock when made of sheet metal, the lock and arrangement of wires and wedge being represented. Fig. 5 is a view similar to Fig. 4, showing the application of my lock with the omission of the wedge. Fig. 6 is a side view of a lock as applied to crossing wires, the lock being bent in a different manner to secure gripping action. Fig. 7 is a view similar to Fig. 6, showing the lock bent in a different manner to secure gripping action. Fig. 8 is a sectional view showing the inwardly-projecting walls, the wedge, and the crimped portions of the legs as employed in holding the wires in position. Fig. 9 is a view similar to Fig. 8, showing the embodiment of the different features of my invention in a single lock.

Referring now to the drawings and more particularly to Figs. 1, 2, and 3 thereof, in constructing a fence in accordance with my invention I first set up a number of posts *b*, to which are secured in any desired manner—though if said posts are of wood staples *c* are usually employed—a series of strand-wires *d*, either plain or barbed, to which are fastened any desired number of upright or stay wires *e*. In order to securely fasten the stay-wires in place, I employ U-shaped blocks *f*, comprising upper and lower legs *g*, having a connecting-web *h* and separated by a slot *i*. The interior face of the web projects into the slot, as shown in Fig. 3 of the drawings, for a purpose, as will be presently explained, while the legs *g* are provided with perforations *k* in alinement perpendicular to the direction of the slot *i*. In applying this lock a strand-wire *d* is entered in the slot, after which a stay-wire *e* is passed vertically through the perforations *k*, and in order to retain the elements in this position a wedge *l* is driven between the inner face of the wall *h* and the stay-wire *d*, either between the strand-wire and the web of the lock or between the wires, as desired. For ordinary purposes it is found that the frictional engagement of this wedge with the adjacent surfaces is sufficient to insure against its displacement; but in order that the wedge may be held absolutely its forward end is cut at an angle to form a face *m*, which face when the wedge is being driven home strikes the curved face *o* of what is termed a "driving-block" *p*, which latter is held with its contracted end *r* against the side of the lock to prevent displacement of the latter when the wedge is being driven. The block $p$ is provided with a groove $s$ to receive the strand-wire $d$. It will thus be seen, as shown in Fig. 3, that as the wedge is driven after engaging the block $p$ it will be turned away from the strand-wire and being bent around the inner face of the web $h$ cannot be withdrawn without being straightened. This straightening action can be secured by hammering the front end of the wedge, when it may be readily driven from place.

Referring now to Fig. 4, I have shown the lock proper made of sheet metal, in which latter instance the projection of the inner face of the web $h'$ is secured by bending the stock of the metal in that direction. In this construction the wedge $l'$ is manipulated after the application of the lock to the strand-wire $d'$ and the insertion of the stay-wire $e'$ in the same manner as above described.

In Figs. 5 and 6 of the drawings I have shown an arrangement of my lock requiring no wedge. In this form of my invention the lock F is made of sheet metal, as above described, and after the application to the strand-wire and the insertion of the stay-wire the web H is driven or pressed inwardly against the strand-wire D to clamp it against the stay-wire E, the rigidity of the stock of the lock maintaining its position.

Fig. 6 shows a section on line 6 6 of Fig. 5 and illustrates the manner in which the forward ends of the legs of the lock may be bent toward each other, which mode of construction may be employed to limit the approach of the ends of the lock when it is desired to bend the legs toward each other to secure the gripping action, as shown in Fig. 7.

Upon reference to Fig. 8 it will be seen that I may employ the crimping of the legs of the lock, as well as the wedge, to hold the wires in position, though it is not necessary that both of these means be used.

Upon reference to Fig. 9 of the drawings it will be seen that I employ in a single construction the different features of my invention and that I may bend the legs 10 inwardly at their ends, in this view the web being caused to project into the slot, a wedge 12 being also employed and driven between the web and the strand-wire 13, the latter being further secured through the medium of inward bends 14 of the legs 10, such inward bends also more firmly securing the stay-wire 15.

It will be readily understood that I may employ any desired material in any portion of my invention and that I may deviate from the specific arrangements herein shown and described without departing in any way from the spirit of my invention.

Having thus described my invention, what I claim is—

1. A fence-lock comprising a body having separate legs and an intervening slot, said legs being connected by a web projecting into the slot, and perforations in the legs.

2. A fence-lock comprising a U-shaped block having perforations in its legs at an angle to the slot of the U, the extremities of the legs being turned toward each other.

3. The combination with a U-shaped block of a wire in the slot of the block, perforations in the legs of the block having a wire therein, a web connecting the legs and a wedge driven between the web and the first-named wire to hold the elements in intimate contact.

4. The combination with a U-shaped block of a wire in the slot of the block, perforations in the legs of the block having a wire therein, a web connecting the legs and a wedge driven between the web and the first-named wire and bent away from the latter to prevent displacement.

5. The combination with a U-shaped block of a wire in the slot of the block, perforations in the legs of the block having a wire therein, a web connecting the legs and having a wall projecting into the slot and a wedge driven between the web and the first-named wire, the wedge being bent within the slot to prevent displacement.

6. The combination with a U-shaped block of a wire in the slot of the U, perforations in the legs of the block, a wire passed through said perforations, and a connecting-web between the legs of the block, said legs being bent inwardly between the wires.

7. The combination with a U-shaped block of a wire in the slot of the U, perforations in the legs of the block, a wire passed through said perforations, a connecting-web between the legs of the block, and a wedge between the web and the first-named wire, the said legs being bent inwardly between the wires.

8. The combination with a U-shaped block of a wire in the slot of the U, perforations in the legs of the block, a wire passed through said perforations, a connecting-web between the legs of the block and a wedge driven between the web and the adjacent wire longitudinally of said wire and slot.

9. The combination with a U-shaped block of a wire in the slot of the U, perforations in the legs of the block, a wire passed through said perforations, a connecting-web between the legs of the block, and a wedge driven between the web and the wire passed through the perforations, and effecting a clamping of the parts, said wedge lying longitudinally of the slot.

10. The combination with a U-shaped block of a wire in the slot of the block, perforations in the legs of the block having a wire therein, a continuous web connecting the legs and a wedge driven longitudinally of the slot and effecting a gripping action of the parts.

In testimony whereof I affix my signature in the presence of witnesses.

GEO. H. CHANDLEE.

Witnesses:
H. CHANDLEE,
C. Z. WHIPPLE.